United States Patent
Lowell et al.

(10) Patent No.: US 6,816,575 B2
(45) Date of Patent: Nov. 9, 2004

(54) SINGLE ENDED LOOP LOSS MEASUREMENT BY FREQUENCY DOMAIN REFLECTOMETRY-BASED SIGNAL PROCESSING

(75) Inventors: Alan Blair Lowell, Camarillo, CA (US); Travis Lee Berrier, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 340 days.

(21) Appl. No.: 10/066,201

(22) Filed: Feb. 1, 2002

(65) Prior Publication Data

US 2002/0089337 A1 Jul. 11, 2002

Related U.S. Application Data

(63) Continuation-in-part of application No. 10/042,769, filed on Jan. 9, 2002, which is a continuation-in-part of application No. 09/456,681, filed on Dec. 9, 1999.

(51) Int. Cl.[7] .......................... H04M 1/24; H04M 3/08; H04M 3/32
(52) U.S. Cl. .................... 379/1.04; 379/1.01; 379/1.03; 379/22; 379/22.02; 379/22.04; 379/24; 379/27.01; 379/27.08
(58) Field of Search ............................... 379/1.01, 1.03, 379/1.04, 22, 22.01, 22.02, 22.03, 22.04, 22.08, 23, 21, 24, 27.01, 27.02, 27.03, 27.08, 28, 29.01, 30, 31; 324/500, 501, 512, 520, 521, 522, 527, 532, 533, 534, 535

(56) References Cited

U.S. PATENT DOCUMENTS

| | | | |
|---|---|---|---|
| 3,870,838 A | 3/1975 | Corwin et al. ...... 179/175.31 R |
| 4,630,228 A | 12/1986 | Tarczy-Hornoch et al. . 364/756 |
| 4,812,738 A | 3/1989 | Itaya et al. .................... 324/58 |
| 5,881,130 A | 3/1999 | Zhang ............................ 379/6 |
| 5,949,236 A | 9/1999 | Franchville ................. 324/533 |
| 5,994,905 A | 11/1999 | Franchville ................. 324/533 |
| 6,014,425 A | 1/2000 | Bingel et al. ................ 379/27 |
| 6,144,721 A | 11/2000 | Stephens ..................... 379/21 |
| 6,177,801 B1 | 1/2001 | Chong ........................ 324/520 |
| 6,256,377 B1 * | 7/2001 | Murphree et al. ........... 379/24 |
| 6,266,395 B1 | 7/2001 | Liu et al. ...................... 379/27 |
| 6,292,539 B1 * | 9/2001 | Eichen et al. ............. 379/1.04 |
| 6,466,649 B1 * | 10/2002 | Walance et al. ......... 379/22.03 |
| 6,531,879 B1 * | 3/2003 | Nero, Jr. ..................... 324/534 |
| 6,538,451 B1 * | 3/2003 | Galli et al. ................. 324/533 |

FOREIGN PATENT DOCUMENTS

CA    2281208    *  2/2001    ............ H04M/3/22

* cited by examiner

Primary Examiner—Quoc D. Tran
(74) Attorney, Agent, or Firm—Allen, Dyer, Doppelt, Milbrath & Gilchrist, P.A.

(57) ABSTRACT

A single ended, frequency domain reflectometry signal processing based scheme measures loop loss of a telecommunications wireline. A distortion-corrected, normalized data array is differentially combined with an associated set of wireline noise spectrum values. The resulting noise margin data is processed by a Shannon Theorem operator, to produce a set of N frequency bins, each containing the number of bits which the link will support for a respective tone. The bit contents of the bins represent a composite bit rate that is available for use for ADSL signalling.

6 Claims, 3 Drawing Sheets

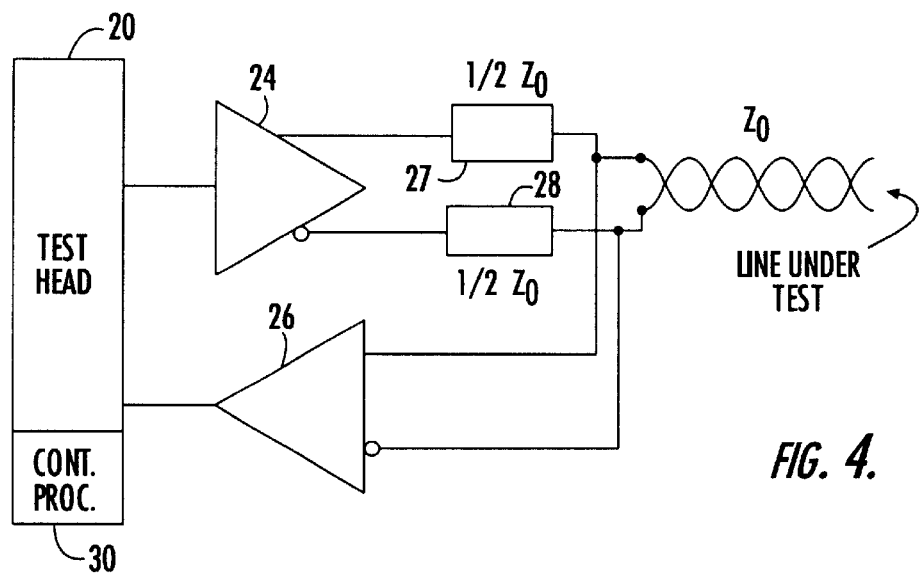
FIG. 4.
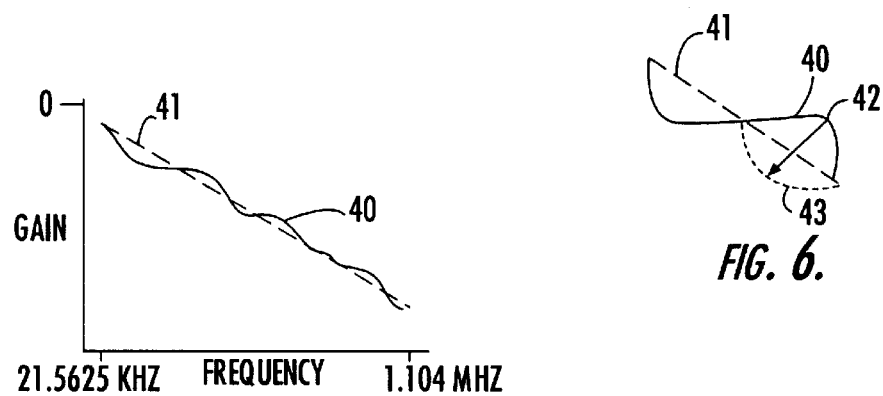
FIG. 5.
FIG. 6.
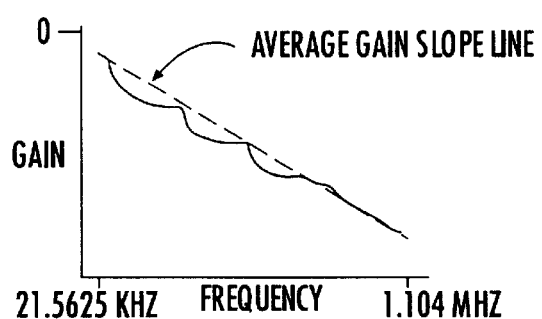
FIG. 7.

SINGLE ENDED LOOP LOSS MEASUREMENT BY FREQUENCY DOMAIN REFLECTOMETRY-BASED SIGNAL PROCESSING

CROSS-REFERENCE TO RELATED APPLICATION

The present application is a continuation-in-part of co-pending U.S. patent application Ser. No. 10/042,769, filed Jan. 9, 2002, by T. Berrier et al, entitled: "Detection of Bridged Taps by Frequency Domain Reflectometry-Based Signal Processing with Precursor Signal Conditioning" (hereinafter referred to as the '769 application), which is a continuation-in-part of co-pending U.S. patent application Ser. No. 09/456,681, filed Dec. 9, 1999, by R. Walance et al, entitled: "Detection of Bridged Taps by Frequency Domain Reflectometry" (hereinafter referred to as the '681 application), each application being assigned to the assignee of the present application and the disclosures of which are incorporated herein.

FIELD OF THE INVENTION

The present invention relates in general to communication test systems and subsystems therefor, and is particularly directed to a frequency domain reflectometry-based test mechanism for measuring attenuation of a telecommunications wireline (e.g., a twisted metallic pair), and using the measured loss to estimate respective upstream and downstream bit rates at which digital subscriber line (DSL) type signals may be transported over the wireline.

BACKGROUND OF THE INVENTION

The ability to conduct high data rate communications between remotely separated data processing systems and associated subsytems and components has become a requirement of a variety of industries and applications, such as business, educational, medical, financial and personal computer uses. Indeed, it can be expected that current and future applications of such communications will continue to engender more systems and services in this technology. Associated with such applications has been the growing use and popularity of the "Internet", which continues to stimulate research and development of advanced data communications systems between remotely located computers, especially communications capable of achieving relatively high data rates over an existing signal transport infrastructure (e.g., legacy copper cable plant).

One technology that has gained particular interest in the telecommunication community is digital subscriber line (DSL) service, which enables a public service telephone network (PSTN) to deliver (over limited distances) relatively high bandwidth using conventional telephone company copper wireline infrastructure. DSL service has been categorized into several different technologies, based upon expected data transmission rate, the type and length of data transport medium, and schemes for encoding and decoding data.

Regardless of its application, the general architecture of a DSL system essentially corresponds to that diagrammatically shown in FIG. 1, wherein a pair of remotely separated, mutually compatible digital communication transceivers (e.g. modems) are coupled to a communication link 10, such as an existing copper plant. One of these transceivers, denoted as a 'west site' DSL transceiver 1, is typically located at a network controller site 2 (such as a telephone company central office); the other, denoted as an 'east site' DSL modem 3, may be coupled with a computer 9 located at a customer premises 4, such as a home or office.

Within the communication infrastructure of the telephone company, the 'west site' DSL transceiver 1 is coupled with an associated 'backbone' network 5, which communicates with other data transport paths, by way of auxiliary equipments 6, such as routers and digital subscriber line access multiplexers (DSLAMs). Through these associated devices, the backbone network 5 may communicate with additional information sources 7 and the Internet 8. This telecommunication fabric thus allows information, such as Internet-sourced data (which is readily accessible via the backbone network 5), to be transmitted from the central office DSL transceiver 1 over the communication link 10 to the compatible DSL transceiver 3 at the customer site 4.

In a DSL system of the type described above, the data rates between DSL transceivers are considerably greater than those for voice modems. For example, while voice modems typically operate at a relatively low band, e.g., from near DC up to on the order of 4 kHz, DSL data transceivers may operate in a bandwidth between frequencies on the order of 125 kHz to well over 1 MHz. This voice/data bandwidth separation allows high rate data transmissions to be frequency division multiplexed with a separate voice channel over a common signal transport path.

Moreover, the high rate data DSL band may be asymmetrically, subdivided, as shown in FIG. 2, into an ADSL format, which allocates a larger (and higher frequency) portion of the available spectrum for 'downstream' (west-to-east in FIG. 1) data transmissions from the central office site to the customer site, than data transmissions in the 'upstream' direction (east-to-west in FIG. 1) from the customer site to the central office. As a non-limiting example, for the case of a single twisted copper pair, a bandwidth on the order of 25 kHz to 125 kHz may be used for upstream data transmissions, while a considerably wider bandwidth on the order of 130 kHz to 1.2 MHz may be used for downstream data transmissions. This asymmetrical downstream vs. upstream allocation of DSL bandwidth is based upon the fact that the amount of data transported from the central office to the customer (such as downloading relatively large blocks of data from the Internet) can expected to be considerably larger than the amount of information (typically email) that users will be uploading to the Internet.

Fortunately, this relatively wide separation between the upstream and downstream data bands facilitates filtering and cancellation of noise effects, such as echoes, by relatively simple bandpass filtering techniques. For example, an upstream echo of a downstream data transmission will be at the higher (downstream) frequency, when received at the central office, so as to enable the echo to be easily filtered from the lower (upstream) frequency signal. Asymmetric frequency division multiplexing also facilitates filtering of near-end crosstalk (NEXT), in much the same manner as echo cancellation.

In addition to performance considerations and limitations on the transport distance for DSL communications over a conventional twisted-pair infrastructure, the cost of the communication hardware is also a significant factor in the choice of what type of system to deploy. Indeed, a lower data rate DSL implementation may provide high-speed data communications, for example, at downstream data rates on the order of or exceeding 1 Mbps, over an existing twisted-pair and at a cost that is competitive with conventional non-DSL components, such as 56 k, V.34, and ISDN modems.

In an effort to optimize the bandwidth and digital signal transport distance of their very substantial existing copper plant (which was originally installed to carry nothing more than conventional analog (plain old telephone service or POTS) signals), telecommunication service providers may perform one or more test and measurement operations on the local loop (twisted wire pair), such as, but not limited to loop loss (attenuation), the presence of bridge-taps or load coils, and data integrity at various segments of cable plant.

Loop loss has been customarily measured by placing a signal transmitter at a first (near) end of the loop and a measurement device at a second (far) end of the loop. The signal generated by the transmitter, which may comprise a tone of known frequency and power, is received by the far end measurement device to determine the insertion loss across the bandwidth of interest for the service being deployed. The measured loop loss may then be compared with existing cable records or deployment guidelines for the network access equipment.

An obvious drawback to this measurement procedure is the need to employ two pieces of test equipment at opposite ends of the loop, which may be separated by miles of communication cable. Also, some test equipment is capable of generating only a limited set of tones, which may constrain testing capabilities for new services. For a given service, the network's access equipment may assist in troubleshooting the local loop, as many different types of equipment are capable of estimating loop loss of signal power, which may be reported through a control port.

SUMMARY OF THE INVENTION

In accordance with the present invention, the need to interactively access and/or conduct a test message exchange session with a test unit installed at a far end of the loop is effectively obviated by a new and improved loop loss measurement mechanism, which employs single ended, frequency domain reflectometry (FDR)-based signal processing of the type disclosed in the above-referenced '769 and '681 applications. By differentially combining a distortion-corrected, normalized amplitude vs. frequency data array with an associated set of wireline noise spectrum values, and processing the resulting noise margin data by a Shannon Theorem operator, the FDR loop loss measurement technique obtains a set of N frequency bins, each containing the number of bits which the link will support for a respective tone. The bit contents of the bins which effectively represent a composite bit rate that is available for use for ADSL signalling.

For this purpose, the invention has a front end tone signal measurement section that includes a processor-controlled, swept tone-generating test head coupled to the wireline under test. As the test head outputs a sequence of digitally created discrete frequency sinusoidal tones, the wireline's response signal level is monitored and digitized. In order to optimize the accuracy of the analysis, the response data is selectively filtered by a high Q, bandpass filter having a center frequency which is varied along the variation of frequency of the tone generator.

The filtered data is full wave rectified to derive root mean square (RMS) values of the signal amplitudes, which are stored with each frequency step iteration, thereby providing a sampled amplitude array of measurement points. The array of digitized amplitude samples produced by the front end, tone signal measurement section is normalized using stored reference data, values of which are derived by applying the tone signals to a known reference component, such as a prescribed value capacitor. This reference is used to simulate the line loss characteristics, which are dependent upon wire gauge number, type of dielectric (insulation), etc.

The normalized data samples are coupled to a distortion correction operator, which corrects for cable feed extensions, the most common form of which are bridged taps, that impact ADSL signal through constructive and destructive interference, manifested as peaks and valleys in the loop loss characteristic. Using the average gain slope from the normalized loss characteristic, peaks above the gain slope line/axis are folded about that axis, so as to produce a set of associated valleys below the axis. Data points more than a prescribed differential off-axis are modified by a correction factor, that is adjustable to accommodate for various cable characteristics, to produce corrected data points.

The distortion-corrected normalized data is differentially combined with an array of power spectral density values associated with the type of modem at the far end of the link. The resulting modem-modified differential data is summed with a signal-to-noise gap constant required for reliable operation and coding gain values associated with the coding gain of the modem transceivers. The coding gain-modified data set is combined in a differential combiner.

A noise spectrum measurement digitizer is coupled to an associated sense amplifier circuit coupled to the wireline, and provides digitized data representative of the line's background noise. The digitized wideband noise floor spectrum values contain N noise values for successive frequency steps having associated tone response data values in the swept tone amplitude response array. These noise values are subtracted from the coding gain modified data set to produce an array of noise margin values. This noise margin data set is processed in a Shannon Theorem operator, the output of which is a set of N frequency bins, each containing the number of bits which the link will support for that tone.

The total number of bits for the N frequency bins effectively represent a composite bit rate that is available for use for upstream and downstream signalling among a variety of DSL formats. The bits/tone composite is coupled to a bin selection operator which selectively subdivides the bits/tone total into upstream and downstream totals in accordance with a user-selected DSL allocation. The upstream and downstream bit rate totals provide estimates of the maximum bit rates at which ADSL signaling may be conducted over the wireline.

BRIEF DESCRIPTION OF THE DRAWINGS

FIG. 4 diagrammatically illustrates the front end tone signal measurement section of the FDR-based loop loss measurement mechanism of FIG. 2;

FIG. 5 is an amplitude vs. frequency response characteristic representative of the sampled amplitude array of measurement points derived by the tone signal measurement section of FIG. 4;

FIG. 6 shows the manner in which distortion correction is performed on the data points of the amplitude vs. frequency response characteristic of FIG. 5; and FIG. 7 shows the amplitude vs. frequency response characteristic of FIG. 5 as corrected for distortion.

DETAILED DESCRIPTION

Figure 1:
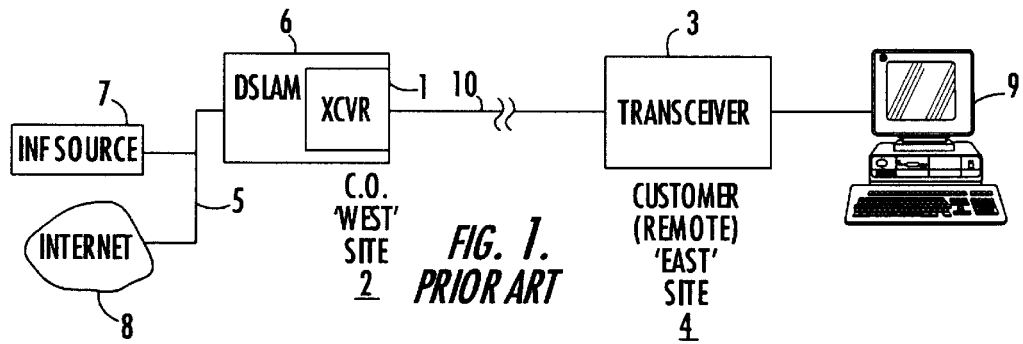
FIG. 1 diagrammatically illustrates the general architecture of a conventional DSL communication system.
Figure 2:
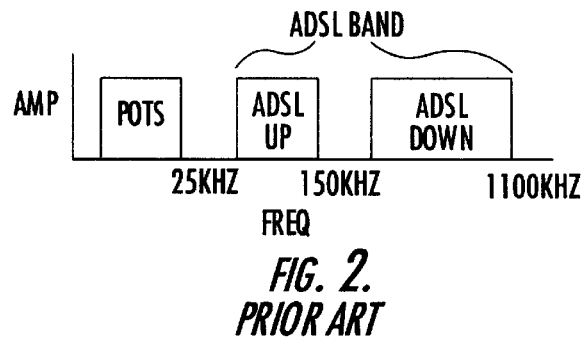
FIG. 2 shows the asymmetrical allocation of an ADSL band into a relatively larger sub-band portion for 'downstream' data transmissions from a central office site to a customer site, and a relatively smaller sub-band portion for 'upstream' data transmissions from a customer site to a central office site.

Before detailing the FDR-based loop loss measurement mechanism of the present invention, it should be observed that the invention resides primarily in a prescribed arrangement of conventional communication hardware components and attendant supervisory communications microprocessor circuitry and application software therefor, that controls the operations of such components and the analysis of signal waveforms interfaced therewith. In a practical implementation that facilitates their incorporation into telecommunication link test equipment (such as that which may be installed at a central office or resident in a portable test device), the inventive arrangement may be readily implemented using a general purpose digital computer, or field programmable gate array (FPGA)-configured, application specific integrated circuit (ASIC) chip sets. In terms of a practical hardware implementation of such chip sets, digital ASICs are preferred.

Consequently, the configuration of such components and the manner in which they may be interfaced with a telecommunication wireline pair have, for the most part, been illustrated in the drawings by readily understandable block diagrams and flow charts, which show only those specific details that are pertinent to the present invention, so as not to obscure the disclosure with details which will be readily apparent to those skilled in the art having the benefit of the description herein. Thus, the block diagrams of the Figures are primarily intended to show the major components and functional modules of the system of the invention in convenient functional groupings, whereby the present invention may be more readily understood.

Figure 3:
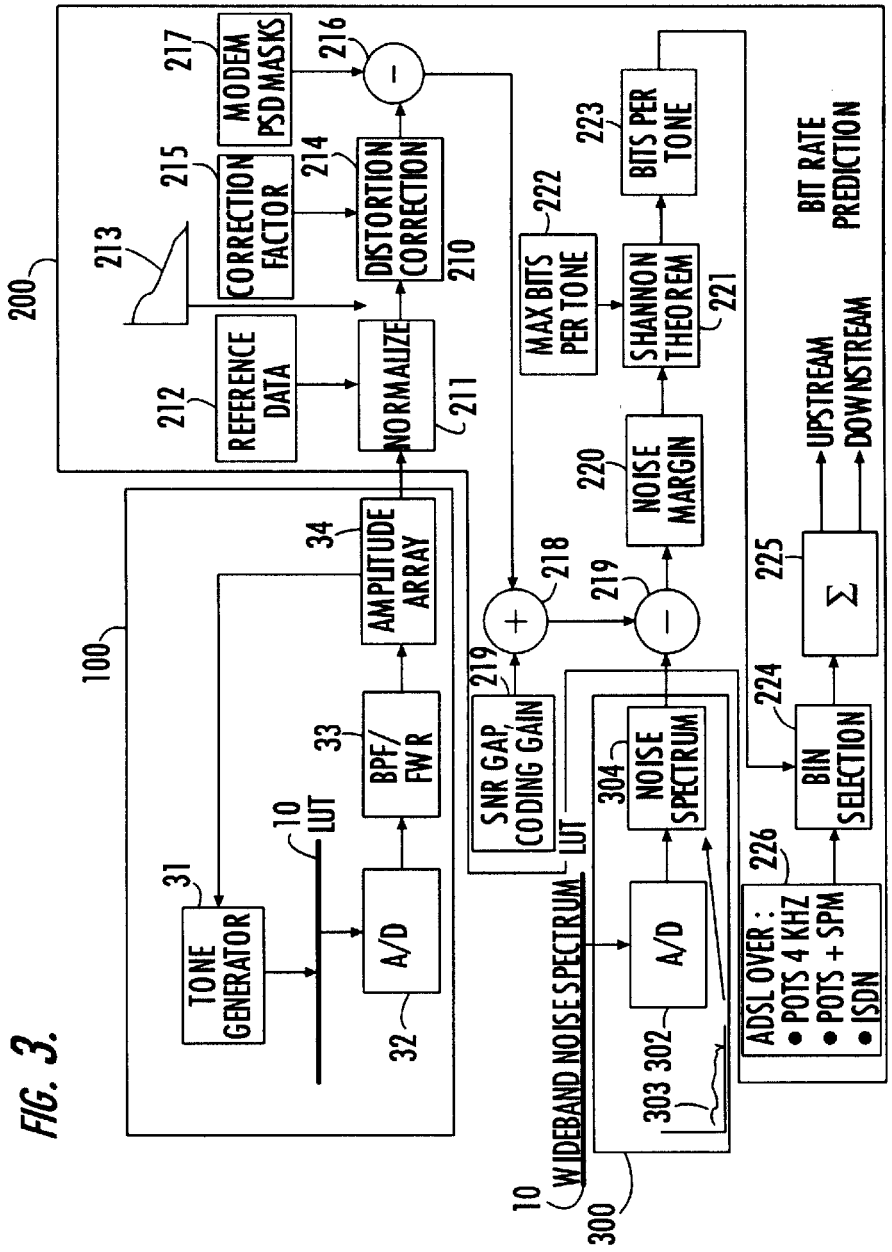
FIG. 3 diagrammatically illustrates the overall system architecture and signal processing functionality of the FDR-based loop loss measurement mechanism of the present invention for measuring loop loss of a wireline pair under test.

FIG. 3 diagrammatically illustrates the overall system architecture and signal processing functionality of the FDR-based signal processing, loop loss measurement mechanism of the present invention for measuring loop loss of a wireline pair 10 under test. The system includes a front end, swept tone signal measurement section 100, which is coupled to the line under test (LUT) 10, and the output of which is supplied as a first input to a downstream processing section 200. Processing section 200 has a second input derived from a noise spectrum measurement section 300, which is coupled to extract a wireband noise spectrum signal from LUT 10.

As pointed out above, in accordance with a non-limiting but preferred embodiment, the front end tone signal measurement section 100 may be of the type disclosed in the above-referenced '769 and '681 applications, shown in FIG. 4. In particular, the swept tone signal measurement section 100 comprises a processor-controlled, swept tone-generating test head 20 (such as may be installed in a central office, or included as part of the test signal generation and processing circuitry of a portable craftsperson's test set).

The test head 20 is controlled by a supervisory control processor 30, which programmed to execute the FDR-based loop loss measurement routine of FIG. 3. For this purpose, the test head is coupled to an access location 11 of the LUT 10 by means of a line-driver amplifier 24 and an input/receiver amplifier 26. The output of the line-driver amplifier 24 is coupled to the LUT 10 through source resistors 27, 28, each of which has an impedance equal to one-half the impedance (Zo) of the LUT 10.

As shown in FIG. 3, the front end tone signal measurement section 100 comprises a tone generation function 31 that generates a series of digitally created test signals, in particular a sequence of N (e.g., 256) discrete frequency sinusoidal tones, to produce what is in effect a frequency-swept sinusoidal waveform, which is applied to the LUT 10 (via the line-driver amplifier 24 of FIG. 4). The swept frequency waveform produced by the tone generator 31 may be varied in a linear, stepwise manner, over the bandwidth of the N frequency tones. As a non-limiting example, the bandsweep may begin at a minimum frequency such as 21.5625 kHz and proceed in incremental frequency steps of 4.3125 kHz/step up to a maximum frequency of 1.104 MHz. (Conversely, the frequency variation may begin at an upper frequency and proceed to a minimum frequency, without a loss in generality.)

During the frequency sweep of the sinusoidal waveform, the wireline's response signal level at the test access point 11 is monitored (via the input amplifier 26), digitized by way of an analog-to-digital converter (ADC) 32, and stored in a signal measurement buffer (not shown). The amplitude of the measured signal response will exhibit a variation with frequency that is a composite of the fluctuations in impedance along the wireline.

In order to optimize the accuracy of the analysis, the response data is selectively filtered by a high Q, bandpass filter (BPF) 33, the center frequency of which is varied, or 'slides', along the variation of frequency of the swept sinusoid generated by the tone generator 31. This bandpass filtering operation provides improved noise immunity by removing discontinuities and any DC level that might cause spurious results, between start and end sample values of the data. The filtered data is full wave rectified (FWR) to derive root mean square (RMS) values of the signal amplitudes, which are stored with each frequency step iteration, to produce a sampled amplitude array of measurement points 34, respective values of which may vary in the manner shown in amplitude vs. frequency plot of FIG. 5.

The array of digitized amplitude samples (e.g., N=256 data points) produced by the front end tone signal measurement section 100 is coupled as a first input to a first processing stage 210 of the processing section 200. The first processing stage 210 includes a normalization operator 211, which is coupled to receive the digitized data samples of the amplitude array 34 produced by the front end section 100, as well as a set of reference data 212. The reference data is stored in a look-up table, the contents of which are data values derived by applying the tone signals to a known reference component, such as a prescribed value capacitor, that is used to simulate the line loss characteristics, which are dependent upon wire gauge number, type of dielectric (insulation), etc. The normalization operator 211 divides the sample values of the data set 34 by associated values extracted from the look-up table, to produce a set of normalized data samples (shown in graphic form at 213), thus effectively calibrating the data for the purpose of obtaining the actual loss of the loop.

The set of normalized data samples is coupled to a distortion correction operator 214 to which a correction factor 215 is applied. Distortion correction operator 214 serves to correct for cable feed extension, the most common form of which are bridged taps, that impact ADSL signal through constructive and destructive interference. This interference manifests itself in peaks and valleys in the loop loss characteristic. Both types of interference cause distortion of ADSL signals because of the round trip time delay of the signals over the length of the bridge tap. The operation carried out by the distortion correction operator 214 is shown in FIG. 6.

As shown therein, using the average gain slope 41 calculated from the normalized loss characteristic 40, all peaks 42 above the gain slope line/axis 41 are folded about that axis, so as to produce a set of associated troughs or valleys 43 below the axis. Those ones of the modified set of data points that are more than a prescribed differential (e.g., 10%) off-axis are multiplied by the correction factor 215, to realize a set of corrected data points shown in FIG. 7. The correction factor 215 is adjustable to accommodate various market regions to compensate for various cable characteristics. The resulting data set of FIG. 7 corresponds to the distortion of FIG. 5 distortion (folded as shown in FIG. 6) into an overstated amount of loss commensurate with the impact of the distortion on DSL signal transmission.

The distortion-corrected normalized data set is then coupled to a first input of a differential operator 216, having a second input coupled to receive an array of power spectral density (PSD) values 217 associated with the type of modem technology to be coupled to the far end of the link. The resulting modem-modified differential data set is then summed in an adder 218 with a signal-to-noise gap constant required for reliable operation and coding gain values 219 associated with the coding gain of the modem transceivers. The coding gain-modified data set is coupled to a differential combiner 219, which is also coupled to the noise spectrum measurement section 300.

The noise spectrum measurement section 300 has an ADC 302 coupled to an associated sense amplifier circuit (not shown), which is similar to that shown in FIG. 4, and coupled to LUT 10 via a line termination impedance corresponding to that exhibited by the line for the band of interest. In the present example of an ADSL application, the termination impedance may be on the order of 100 ohms. The sensed wireline characteristic 303 is representative of the line's background noise. The output of the ADC 302 is a set of digitized wideband noise floor spectrum values 304 distributed across the entirety of the monitored band of interest. Within this noise floor spectrum there are N noise values for the successive 4.3125 kHz frequency steps having associated tone response data values in the amplitude array provided by processing section 200. These noise values are subtracted from the coding gain modified data set by the differential combiner 219 to produce an array of noise margin values 220.

The resulting noise margin data set 220 is processed in a Shannon Theorem operator 221 (to which a prescribed maximum number of bit per tone value 222 is coupled) to determine the number of bits per tone/frequency that can be supported by the link's noise margin. The output of the Shannon Theorem operator 221 is a set of N frequencies or frequency bins, each containing a respective number of bits which the link will support for that tone. The total number of bits 223 for the N frequency bins effectively represent a composite bit rate that is available for use for upstream and downstream signalling among a variety of DSL formats.

Non-limiting examples include ADSL over POTS traffic, which uses bandwidth below 4 kHz and all discrete multitone channels above channel 5. ADSL over POTS plus subscribed private metering (SPM) reserves an additional segment of analog bandwidth to support 16 kHz toll rate metering pulses on the line. A third non-limiting example is ADSL over ISDN (2B1Q) service that only uses channels above channel 36. The bits/tone composite is coupled to a bin selection operator 224, which selectively subdivides the bits/tone total 223 into upstream and downstream totals 225 in accordance with a user-selected DSL allocation supplied at 226. The upstream and downstream bit rate totals may be used to estimate the maximum bit rates at which ADSL signaling may be conducted over the wireline under test.

As will be appreciated from the foregoing description, the conventional dual-ended, interactive approach to measuring loop loss of a wireline, such as for determining its bit rate capacity for ADSL signaling, is effectively obviated in accordance with the single ended, frequency domain reflectometry signal processing based scheme of the present invention. By differentially combining a distortion-corrected, normalized data array with an associated set of wireline noise spectrum values, and processing the resulting noise margin data by a Shannon Theorem operator, the FDR loop loss measurement technique obtains a set of N frequency bins, each containing the number of bits which the link will support for a respective tone. The bit contents of the bins effectively represent a composite bit rate that is available for use for ADSL signalling.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A method of deriving a measure of signal transport loss of a wireline telecommunication link comprising the steps of:

(a) coupling a varying frequency waveform of a prescribed bandwidth to a first location of said wireline telecommunication link;

(b) at said first location of said wireline telecommunication link, measuring variations in signal level response in association respective frequencies of said varying frequency waveform; and (c) generating a measure of said signal transport loss over said prescribed bandwidth based upon said variations in signal level response measured in step (b), wherein step (c) comprises:

c1—normalizing said variations in signal level response in accordance with reference data representative of simulated characteristics of said line;

c2—modifying said normalized variations in signal level response to correct for constructive and destructive interference associated with reflections from discontinuities along said wireline, and thereby produce a distortion-corrected normalized signal response;

c3—differentially combining said distortion-corrected normalized signal response with power spectral density values associated with the type of transceiver employed at a remote end of said wireline, to produce a modified differential data set;

c4—summing said modified differential data set with a signal-to-noise gap constant required for reliable operation and coding gain values associated with the coding gain of said transceiver, to produce a coding gain-modified data set;

c5—measuring background noise of said wireline telecommunication link;

c6—differentially combining said coding gain-modified data set with said background noise measured in step c5, to obtain a set of noise margin data values associated with said respective frequencies of said varying frequency waveform; and c7—processing said set of noise margin data values obtained in step c6 to produce a set of frequency bins having bit contents which effectively represent a composite bit rate available for digital signal transport over said wireline telecommunication link.

2. The method according to claim 1, further including the step of:

(d) processing said variations in signal level response measured in step (b) to provide an estimate of respective upstream and downstream bit rates at which digital subscriber line (DSL) type signals may be transported over said wireline.

3. The method according to claim 1, wherein step c7 comprises processing said set of noise margin data values obtained in step c6 in accordance with a Shannon Theorem operator.

4. For use with a test device for measuring one or more characteristics of a telecommunication wireline, an arrangement for deriving a measure of signal transport loss of said wireline telecommunication link comprising:

a signal interface for coupling signals to and receiving signals from a single-ended location of said telecommunication wireline; and a digitally controlled signal generation and response measurement unit, which is coupled with said signal interface and is operative to perform the following steps:

(a) supplying a varying frequency waveform of a prescribed bandwidth for to said signal interface and application thereby to said single-ended first location of said wireline telecommunication link; and (b) processing variations in signal level response, as received by said signal interface in association respective frequencies of said varying frequency waveform, to generate therefrom a measure of said signal transport loss over said prescribed bandwidth, wherein (b) comprises:

b1—normalizing said variations in signal level response in accordance with reference data representative of simulated characteristics of said line;

b2—modifying said normalized variations in signal level response to correct for constructive and destructive interference associated with reflections from discontinuities along said wireline, and thereby produce a distortion-corrected normalized signal response;

b3—differentially combining said distortion-corrected normalized signal response with power spectral density values associated with the type of transceiver employed at a remote end of said wireline, to produce a modified differential data set;

b4—summing said modified differential data set with a signal-to-noise gap constant required for reliable operation and coding gain values associated with the coding gain of said transceiver, to produce a coding gain-modified data set;

b5—measuring background noise of said wireline telecommunication link;

b6—differentially combining said coding gain-modified data set with said background noise measured in step b5, to obtain a set of noise margin data values associated with said respective frequencies of said varying frequency waveform; and b7—processing said set of noise margin data values obtained in step b6 to produce a set of frequency bins having bit contents which effectively represent a composite bit rate available for digital signal transport over said wireline telecommunication link.

5. The arrangement according to claim 4, wherein step b7 comprises processing said set of noise margin data values obtained in step b6 in accordance with a Shannon Theorem operator.

6. The arrangement according to claim 4, further including an auxiliary signal interface coupled to receive background noise from said single-ended location of said telecommunication wireline, and wherein step b5 comprises monitoring said auxiliary signal interface to provide said measure of background noise of said wireline telecommunication link.

* * * * *